United States Patent
Patwardhan (10) Patent No.: US 11,444,924 B2
(45) Date of Patent: Sep. 13, 2022

(54) APPLICATION-LAYER SERVICE TRAFFIC COMMUNICATION USING DATACENTER NETWORK FABRIC AS PROXY

(71) Applicant: Cisco Technology, Inc., San Jose, CA (US)

(72) Inventor: Sourabh Patwardhan, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 919 days.

(21) Appl. No.: 16/243,945

(22) Filed: Jan. 9, 2019

(65) Prior Publication Data

US 2020/0220848 A1    Jul. 9, 2020

(51) Int. Cl.
| | |
|---|---|
| H04L 9/40 | (2022.01) |
| G06F 16/245 | (2019.01) |
| H04L 9/08 | (2006.01) |
| H04L 49/15 | (2022.01) |
| H04L 67/56 | (2022.01) |

(52) U.S. Cl.
CPC ........ *H04L 63/0281* (2013.01); *G06F 16/245* (2019.01); *H04L 9/083* (2013.01); *H04L 49/15* (2013.01); *H04L 67/28* (2013.01)

(58) Field of Classification Search
CPC .................................................... H04L 49/15
See application file for complete search history.

(56) References Cited

U.S. PATENT DOCUMENTS

| | | | |
|---|---|---|---|
| 10,742,557 B1* | 8/2020 | Miriyala | H04L 49/70 |
| 2015/0317169 A1* | 11/2015 | Sinha | H04L 49/254 713/2 |
| 2017/0026417 A1* | 1/2017 | Ermagan | H04L 63/20 |
| 2018/0019948 A1 | 1/2018 | Patwardhan et al. | |
| 2018/0027080 A1 | 1/2018 | Yang et al. | |
| 2019/0052532 A1* | 2/2019 | Chen | H04L 43/0876 |
| 2019/0190729 A1* | 6/2019 | Levy-Abegnoli | H04L 12/185 |
| 2020/0218798 A1* | 7/2020 | Kosaka | G06F 21/629 |

OTHER PUBLICATIONS

Notification of Transmittal of the International Search Report and The Written Opinion issued in PCT/US2020/012200, dated Mar. 18, 2020; 21 pages.

(Continued)

*Primary Examiner* — Esther B. Henderson
(74) *Attorney, Agent, or Firm* — Merchant & Gould P.C.

(57) ABSTRACT

A system for providing services for microservices applications is described herein. In an embodiment, a system comprises a plurality of container environments, each of which comprising a host node. A virtual fabric edge instance executes on each host node. The host nodes are interconnected through a plurality of switches. A fabric controller manages the plurality of switches and implements policies through the virtual fabric edge instances executing on each host node. The fabric controller additionally provides services for the application instances through the virtual fabric edge instances by routing traffic, data, queries from an application or proxy instance to another application or proxy instance in the container environment through the virtual fabric edge instances.

18 Claims, 3 Drawing Sheets

(56) References Cited

OTHER PUBLICATIONS

Cisco: "Cisco ACI Virtual Edge Overview", Dec. 24, 2017 (Dec. 24, 2017), XP055675472, Retrieved from the Internet: URL:https://www.cisco.com/c/en/us/td/docs/switches/datacenter/aci/aci_virtual_edge/installation upgrade/1-x/b Virtual Edge Installation_Guide_1_1_1/b_AVE_InstaTlation_GuideX chapter 00.pdf the whole document (6 pages).

* cited by examiner

APPLICATION-LAYER SERVICE TRAFFIC COMMUNICATION USING DATACENTER NETWORK FABRIC AS PROXY

FIELD OF THE DISCLOSURE

One technical field of the present disclosure is deployment of datacenter fabrics. Another technical field is implementation of service meshes for microservices deployed in a datacenter.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

In the modern service-oriented structured paradigm, there has been an increasing focus on using service meshes to provide Layer 7 services for microservices application. For instance, microservices application executing on different host nodes in a datacenter may require health checks on the application, service discovery for the application, or global rate limiting for the application.

Sidecar proxies are often used to provide the commonly-needed Layer 7 services for the applications. A sidecar proxy is a proxy instance that is dedicated to a specific application instance and communicates with other sidecar proxies executing on different nodes for information regarding the application.

Sidecar proxies are often used due to their utility and reliability in providing required services. For instance, middle proxies are not close enough to the workload to obtain information about the application instances without sending a query to each of the nodes. Additionally, middle proxies can be a single point of failure for a plurality of nodes. Sidecar proxies solve these issues by executing in tandem with the application instances and providing a distributed information source such that the failure of one does not condemn the whole system.

Sidecar proxies additionally allow microservices to be multi-tenanted by providing a separate sidecar proxy for each application instance. If end-to-end encryption is needed, the sidecar proxy can perform the encryption or decryption on behalf of the microservices application.

A major issue with sidecar proxies is that they are inefficient in obtaining information regarding application instances executing on other nodes. As there is no central repository for the application information, a sidecar proxy must communicate with sidecar proxies on each node executing application instances for the microservices application to obtain information regarding global rate limiting, service discovery, or overall health of discovered services.

Thus, there is a need for a system which efficiently provides services for Layer 7 applications which is close to the workload, avoids a single point of failure, provides functionality for multitenancy, and provides for end-to-end encryption in application traffic.

SUMMARY

The appended claims may serve as a summary of the invention.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

1. General Overview

Methods for improving the implementation of service meshes by utilizing the datacenter fabric are described herein. According to an embodiment, the datacenter fabric is managed through a fabric controller which communicates with virtual fabric edges executing on host nodes in a datacenter. Application traffic from microservice application instances is routed through the virtual fabric edges, thereby granting the fabric controller global visibility in executed services and traffic flows. The fabric controller is able to provide policies or statistics for enforcement by the service mesh proxy through the virtual fabric edges. End-to-end encryption can be performed through API interactions between the fabric controller and the container orchestrator. Multi-tenancy can be provided through the use of VxLAN overlays provided by the virtual fabric edges while routing the outgoing traffic.

In an embodiment, a system comprises a plurality of container environments, each of which comprising a host node; a plurality of switches configured to interconnect the plurality of container environments; a fabric controller configured to manage the plurality of switches and to implement policies through virtual fabric edge instances executing on each host node; the fabric controller being further configured to implement application functions through the virtual fabric edge instances by routing application traffic from application instances in the container environment through the virtual fabric edge instances.

In an embodiment, the application functions comprise one or more of service discovery or application health checking functions.

In an embodiment, the system further comprises a service mesh proxy executing in each of the plurality of container environments, the service mesh proxy in each container environment being configured to query the virtual fabric edge instance for data regarding application functions. In an embodiment, the fabric controller is configured to, in response to the service mesh proxy querying the virtual fabric edge instance for data regarding application functions, download the data regarding the application functions into a switch connected to the container environment containing the service mech proxy.

In an embodiment, the virtual fabric edge instances are configured to use VxLAN overlays to provide isolation between different application instances in a container environment.

In an embodiment, the fabric controller is further configured to obtain encryption keys for application instances from a container orchestrator and securely distribute the encryption keys to the virtual fabric edge instances.

In an embodiment, the fabric controller is configured to store data defining a rate limiting policy for an application and enforce the rate limiting policy through the virtual fabric edge instances.

In an embodiment, a method comprises storing, on a host node in a virtual container environment, a virtual fabric edge instance configured to implement datacenter policies received by a fabric controller; executing, in the virtual container environment an application instance of an application; routing application traffic from the application instance in the container environment to one or more switches through the virtual fabric edge instance.

In an embodiment, the method further comprises sending, from the virtual fabric edge instance to a fabric controller, data describing routed application instance traffic; receiving, at the virtual fabric edge instance from an application instance proxy in the container environment, a query for data regarding the application instance; routing the query from the virtual fabric instance through the one or more switches; downloading a response to the query from the fabric controller into the one or more switches; caching the response to the query at the virtual fabric instance. In an embodiment, the query comprises a request for data regarding one or more of service discovery or application health checking.

In an embodiment, the method further comprises storing, on the fabric controller, a rate limiting policy for the application; using the rate limiting policy for the application stored on the fabric controller, limiting application traffic of the application instance through the virtual fabric edge instance.

In an embodiment, the method further comprises receiving, at the virtual fabric edge, encrypted application traffic for the application instance; using the fabric controller, requesting an encryption key from a container orchestrator; receiving the encryption key at the fabric controller and sending the encryption key to the virtual fabric edge for decrypting the application traffic.

In an embodiment, the method further comprises providing isolation between the application instance and a second application instance using VxLAN overlays.

2. Structural and Functional Examples

Figure 1:
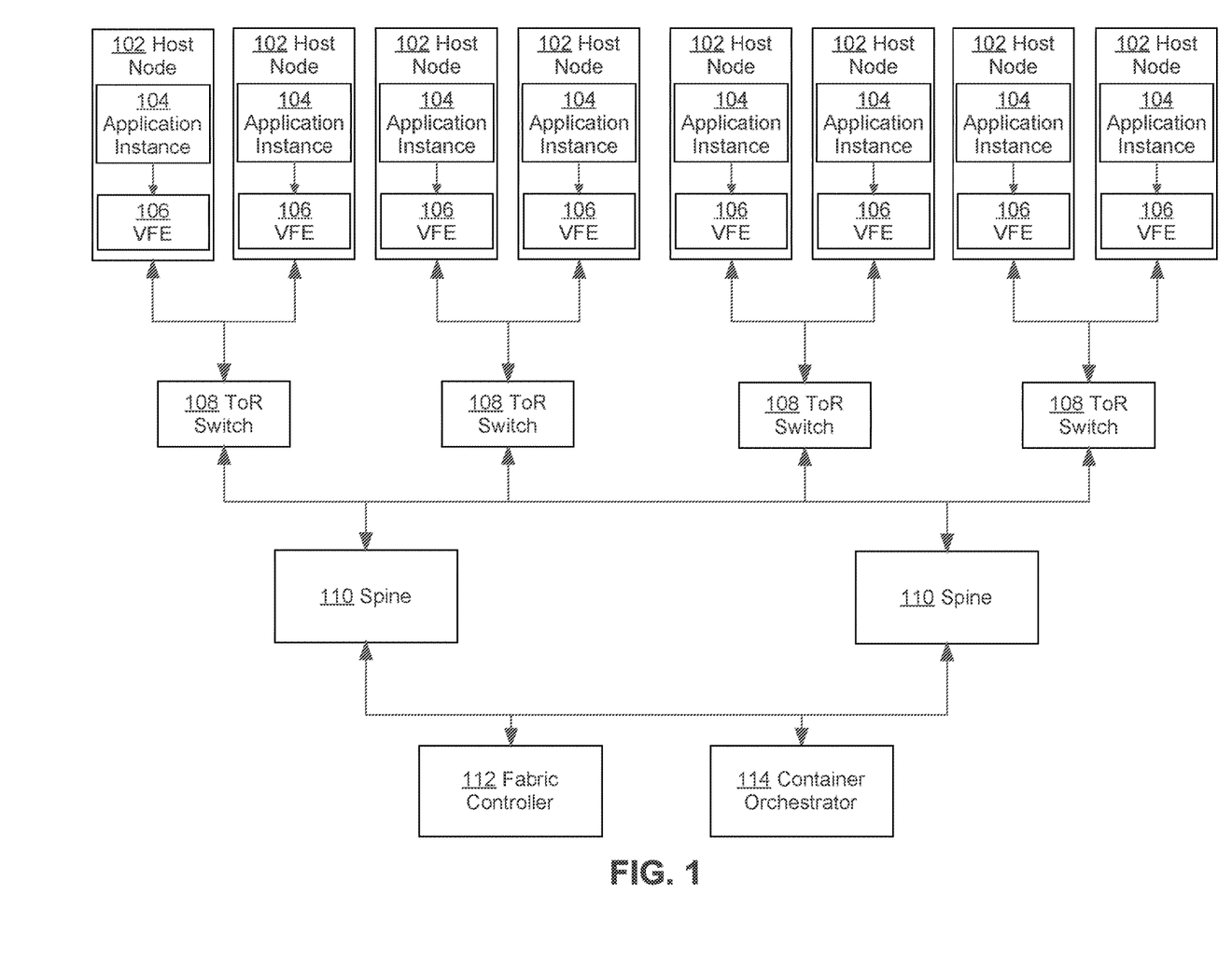
FIG. 1 depicts an example system for providing a middle proxy for service meshes for containerized micro-services in datacenter deployments.

FIG. 1 depicts an example system for providing a middle proxy for service meshes for containerized micro-services in datacenter deployments. The various elements of FIG. 1 communicate over a network using network switches such as through a leaf spine architecture, e.g., a CLOS network topology, although embodiments are not limited to this example and are applicable to any datacenter fabric monitored by a fabric controller.

Host nodes 102 may be any computer systems configured to communicate in a datacenter. The host nodes 102 may host one or more container environments, such as Docker or Kubernetes containers. For example, Docker or Kubernetes containers may be hosted on server computers. Each container environment is a stand-alone executable software package that provides particular services and includes everything need to run the software package, including code, runtime, system libraries, settings, etc. The container environments may implement a Container Network Interface (CNI) networking model or a Container Network Model (CNM) adopted by popular container orchestrators to perform local programming.

The host nodes 102 execute one or more application instances 104. The application instance 104 comprises a micro-service that is executed in a container environment. Different host nodes may execute application instances of various microservices. For the purpose of providing a clear example of the network topography, each host node 102 is depicted executing application instance 104, but the application instances executing on the various host nodes may differ in configuration and/or application type. The application instances may be executed as part of a service mesh, such as the Istio/Envoy service mesh available commercially on GitHub. The service mesh comprises a configurable infrastructure layer for one or more microservices application.

The host nodes 102 each comprise a virtual fabric edge instance (VFE) 106 executing on the host node. The VFE 106 comprises executable software which is configured to cause the host node to identify and authenticate end points and register end-point identification information in a fabric host-tracking database. The VFE may contain a port in each container pod namespace and act as a bridge between the host nodes 102 and the top of rack (ToR) switches 108.

In an embodiment, the VFE is configured to route network traffic through top of rack (ToR) switches 108. ToR switches 108 comprise network switches which are configured to interconnect host nodes in a datacenter. ToR switches 108 may be connected to spines 110 based on a leaf/spine datacenter fabric, such as the CLOS network topology.

The fabric controller 112 comprises a central entity configured to manage operation of a network fabric, such as by providing overlay reachability information and end points-to-routing location mapping. An example of a fabric controller is the Cisco Application Policy Infrastructure Controller (APIC) which is a unifying point of automation and management for the Cisco Application Centric Infrastructure (ACI) fabric. The fabric controller 112 may be implemented on a computing system that is communicatively coupled to the host nodes through the network fabric architecture.

The container orchestrator 114 comprises a central entity that acts as a resource manager for container environments operating on host nodes. The container orchestrator may be configured to allocate and provide resources to container environments, provide instructions to systems instructions executing container environments, obtain and distribute attribute data regarding container environments, and otherwise manage deployment and implementation of container environments. Example container orchestrators 114 include, but are not limited to, Docker Swarm provided by Docker, the Kubernetes container orchestration tools provided by Google, and the Marathon container orchestration framework provided by Apache.

3. Utilizing Datacenter Fabric as Middle Proxy

Figure 2:
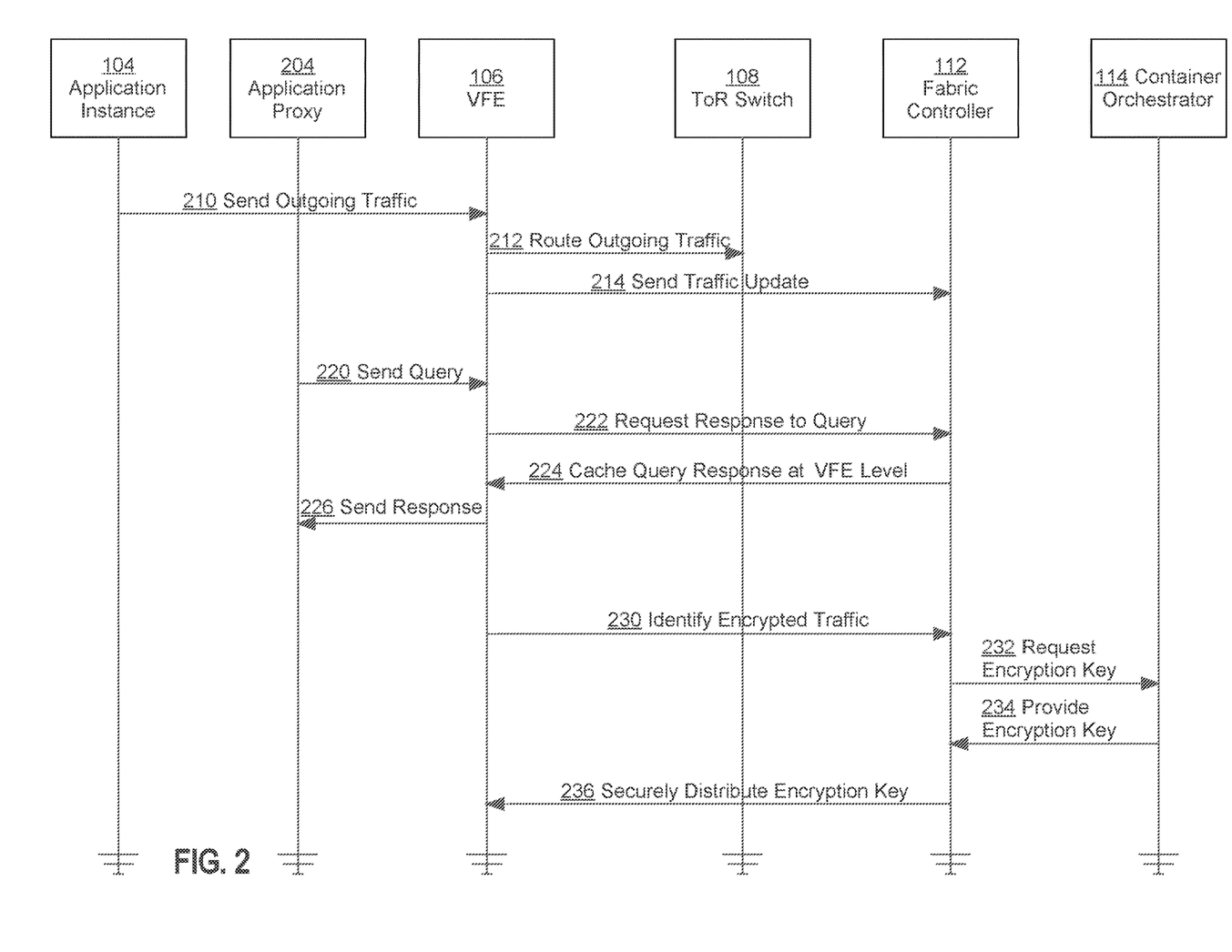
FIG. 2 depicts a method for providing a middle proxy for service meshes for containerized micro-services in datacenter deployments.

FIG. 2 depicts a method for providing a middle proxy for service meshes for containerized micro-services in datacenter deployments.

In an embodiment, an application instance is executed in a container environment as part of a service mesh for a microservices application. While FIG. 2 depicts a single application instance, embodiments may be performed with multiple application instances corresponding to different applications.

In an embodiment, an application proxy 204 additionally executes in the container environment. The application proxy 204 may be configured to implement enforcement of policies relating to the application instance. As an example, the Envoy sidecar proxy may additionally be executed to enforce policies for an Envoy service mesh. The application proxy 204 may be further configured to communicate with the VFE 106 to obtain information regarding the application. For example, the datacenter fabric may be integrated with the service mesh by allowing the VFE 106 to provide key services to either the application instance 104 or the application proxy 204.

In an embodiment, VFE 106 is used to monitor application data relating to application instance 104. For example, at step 210 in FIG. 2, the application instance executing in the container environment on the host node sends outgoing traffic to VFE 106. In an embodiment, the VFE 106 acts as a proxy for any Layer 7 service where the network fabric provides policies or statistics for enforcement. Thus, microservice applications may be pre-identified as delegated or non-delegated services such that the host node can determine whether to route the outgoing traffic through the VFE 106 if the service has been pre-identified as a delegated service.

At step 212, the VFE 106 routes the outgoing traffic to the ToR switch 108. For example, the VFE may route the outgoing traffic through the next-hop proxy. In the CLOS architecture, the ToR switches are connected to a plurality of spines, thereby ensuring multiple levels of redundancy for data relating to the microservices application.

At step 214, the VFE 106 sends a traffic update to the fabric controller 112. For example, the fabric controller may receive data regarding routed traffic directly from the VFE host node or indirectly through the datacenter fabric architecture. By allowing the fabric controller to monitor the application traffic that is routed by the VFE, the system provides the multiple levels of redundancy through the spines of the datacenter architecture while utilizing the VFEs which are close to the microservices workload.

By routing all of the outgoing application traffic through the VFE on each container environment, the system is able to provide the benefits of a sidecar proxy being close to the workload. By utilizing the datacenter fabric, the system is able to provide multiple levels of redundancy and remove the single point of failure of a middle proxy. Additionally, by utilizing the network fabric, application instance data from other nodes is readily available and can be provided more efficiently without queries being sent to a plurality of different host nodes.

In an embodiment, the system integrates the datacenter fabric with the container orchestrator. The datacenter fabric has global visibility of executed services and traffic flows while the container orchestrator stores information about deployed services. Thus, the fabric controller 112 may request application data through an API transaction with the container orchestrator to request information about deployed services for use in responding to requests from the VFE.

3.1. Cooperation Between Fabric and Application Proxy

In an embodiment, the VFE works alongside an application proxy to provide policies or statistics for enforcement while leaving the actual enforcement to the application proxy. For example, at step 220, the application proxy sends a query to the VFE 106. The query comprises a request for information regarding the implementation of the microservices application. For example, the query may be a service discovery query and/or a request to assist in health-checks of various discovered services.

At step 222, the VFE 106 requests a response to the query from the fabric controller 112. For example, the VFE may route the query to the next-hop ToR switch for routing to the fabric controller. While embodiments are described using an application proxy, in other embodiments the VFE may communicate directly with the application instance.

In an embodiment, the VFEs executing on the host nodes perform endpoint discovery and report the endpoints to the fabric controller. The fabric controller uses endpoint learning, query, and aging to assist in performing service discovery and health-checks.

In an embodiment, the query comprises a request to perform global rate limiting for the microservices application. Additionally or alternatively, the fabric controller may facilitate in global rate limiting without receiving a query from the VFE. In an embodiment, the rate limiting data is defined in the application policies in the fabric controller. The fabric controller may send the rate limiting policies to the VFEs that route traffic for the microservices application. The VFEs may communicate the rate limiting policies to the application proxy which enforces the rate limiting policies.

At step 224, the fabric controller caches a query response at the VFE level. For example, if the query was a request for performing service discovery, the fabric controller may route data through the ToR switch to the VFE which includes data identifying discovered services. If the query was a request for performing health-checks, the fabric controller may route data through the ToR switch to the VFE which includes data describing the health of the microservices application based on other interactions with the microservices application from VFEs executing on different host nodes.

At step 226, the VFE 106 sends the response to the application proxy. For example, the VFE may respond to the application proxy with the cached response. While embodiments describe the VFE requesting the data in response to the query by the application proxy, in embodiments the fabric controller may update the VFE periodically with discovered services, health-check data, or rate limiting policies. The VFE may cache the data received from the fabric controller and respond to queries from the application proxy with the cached data.

3.2. Providing Encryption

In an embodiment, the datacenter fabric can be used to provide end-to-end encryption for micro-services. For example, at step 230, the VFE 106 may identify encrypted traffic for an application instance. While steps 230-236 are described with respect to decrypting traffic, a similar method may be performed for encrypting the traffic to send to a different node. For example, step 230 may comprise identifying traffic for an application that is to be encrypted. Identifying encrypted traffic may comprise determining that a microservices application designated as using end-to-end encryption has sent data through the VFE. Identifying traffic for an application that is to be encrypted may similarly comprise determining that a microservice application that is designated as using end-to-end encryption is requesting to send outgoing data through the VFE.

At step 232, the fabric controller 112 requests an encryption key from the container orchestrator 206. For example, the container orchestrator 206 may store encryption keys for each of the microservices applications. The fabric controller 112 may communicate with the container orchestrator through API interactions to request the encryption keys for the microservices application with traffic being routed through the VFE. At step 234, the container orchestrator 206 provides the encryption key to the fabric controller 112, such as through the API interactions described.

At step 236, the fabric controller 112 securely distributes the encryption key to the VFE 106. For example, the fabric controller may route the encryption key through the ToR switches directly to the VFE. The VFE may then use the encryption key to encrypt outgoing traffic or decrypt incoming traffic. In this way, the VFEs only store and use the encryption keys when routing encrypted traffic. This allows for end-to-end encryption to be performed through the VFEs without storing encryption keys for each microservices application on each of the host nodes.

3.3. Providing Multi-Tenancy

In an embodiment, the datacenter fabric can be used to provide multi-tenancy for applications. Per-node proxies do not allow for the microservices to be multi-tenanted. The VFEs, on the other hand, can provide multi-tenancy for the applications by isolating between different microservice instances.

In an embodiment, the VFE uses VxLAN overlays to provide isolation between different microservice instances. For example, the VFE may specify a VxLAN identification number for each microservice instance. The VFE may then route traffic using the VxLAN overlays, in cooperation with the fabric controller and the container orchestrator, to other host nodes which then identify the microservice instance using the VxLAN identification number.

Integrating the datacenter fabric with the service mesh for the microservices provides many of the benefits of using a sidecar proxy model. The VFEs are able to provide application information while being close to the workload of the microservices on each node. The use of the leaf/spine architecture removes the single-point of failure issue with middle proxies. The use of VxLAN overlays allows the VFE to provide multi-tenancy for the microservices. Additionally, the VFE's can provide end-to-end encryption through cooperation between the fabric controller and the container orchestrator.

Additionally, the use of the fabric controller allows for more efficient service discovery, health-checks, and global rate limiting as the fabric controller has global visibility of executed services and traffic flows. The use of the fabric controller allows the service mesh implementation to be simplified through the removal of the sidecar proxy. Additionally, the use of the fabric controller allows for efficient use of endpoint learning at the network fabric level to avoid redundant data collection at the service mesh level, thereby conserving network bandwidth used for the Layer 7 applications.

4. Implementation Example—Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 3:
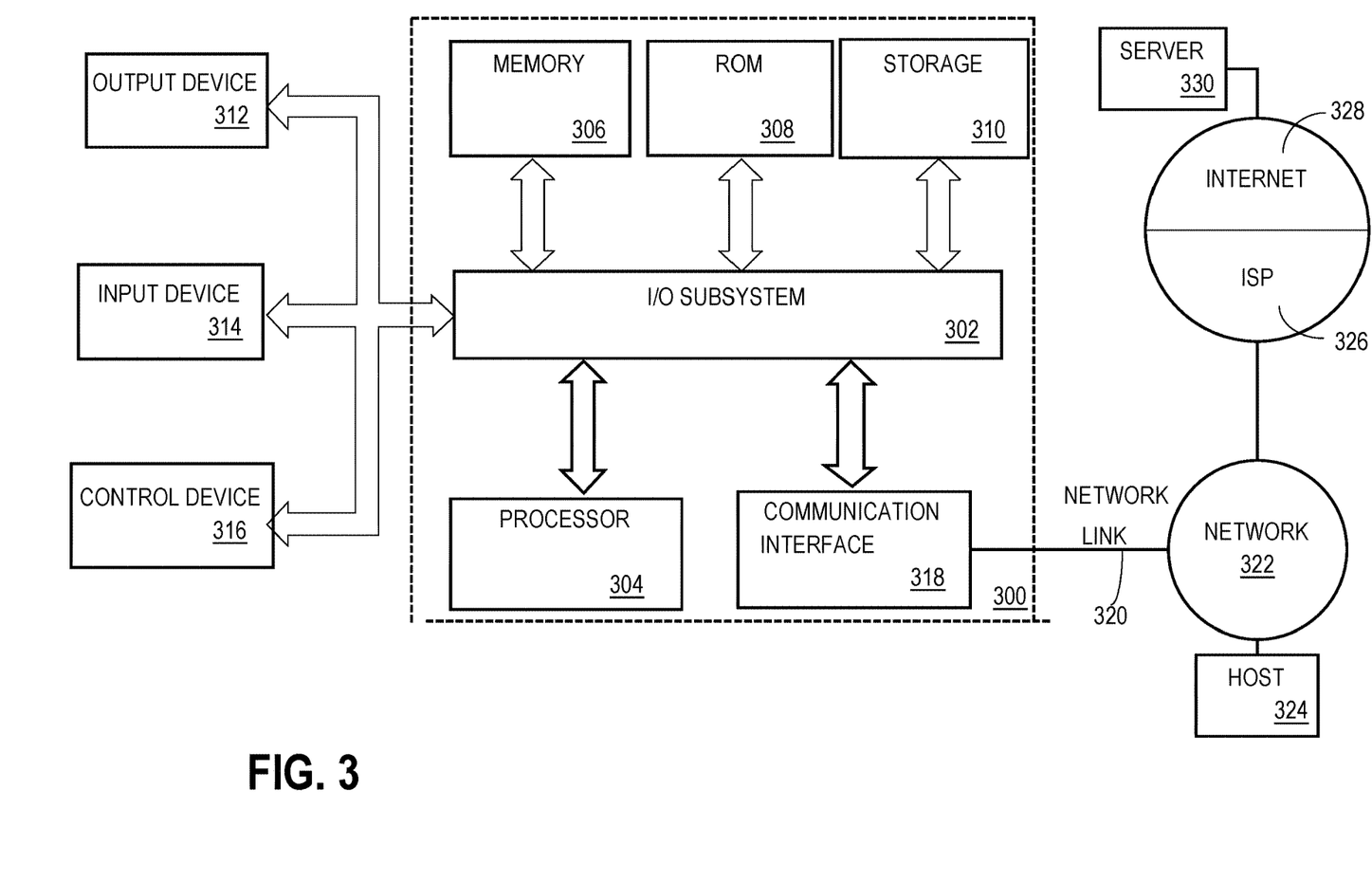
FIG. 3 is a block diagram that illustrates an example computer system with which an embodiment may be implemented.

FIG. 3 is a block diagram that illustrates an example computer system with which an embodiment may be implemented. In the example of FIG. 3, a computer system 300 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 300 includes an input/output (I/O) subsystem 302 which may include a bus and/or other communication mechanism(s) for communicating information and/or instructions between the components of the computer system 300 over electronic signal paths. The I/O subsystem 302 may include an I/O controller, a memory controller and at least one I/O port. The electronic signal paths are represented schematically in the drawings, for example as lines, unidirectional arrows, or bidirectional arrows.

At least one hardware processor 304 is coupled to I/O subsystem 302 for processing information and instructions. Hardware processor 304 may include, for example, a general-purpose microprocessor or microcontroller and/or a special-purpose microprocessor such as an embedded system or a graphics processing unit (GPU) or a digital signal processor or ARM processor. Processor 304 may comprise an integrated arithmetic logic unit (ALU) or may be coupled to a separate ALU.

Computer system 300 includes one or more units of memory 306, such as a main memory, which is coupled to I/O subsystem 302 for electronically digitally storing data and instructions to be executed by processor 304. Memory 306 may include volatile memory such as various forms of random-access memory (RAM) or other dynamic storage device. Memory 306 also may be used for storing temporary variables or other intermediate information during execution of instructions to be executed by processor 304. Such instructions, when stored in non-transitory computer-readable storage media accessible to processor 304, can render computer system 300 into a special-purpose machine that is customized to perform the operations specified in the instructions.

Computer system 300 further includes non-volatile memory such as read only memory (ROM) 308 or other static storage device coupled to I/O subsystem 302 for storing information and instructions for processor 304. The ROM 308 may include various forms of programmable ROM (PROM) such as erasable PROM (EPROM) or electrically erasable PROM (EEPROM). A unit of persistent storage 310 may include various forms of non-volatile RAM (NVRAM), such as FLASH memory, or solid-state storage, magnetic disk or optical disk such as CD-ROM or DVD-ROM, and may be coupled to I/O subsystem 302 for storing information and instructions. Storage 310 is an example of a non-transitory computer-readable medium that may be used to store instructions and data which when executed by the processor 304 cause performing computer-implemented methods to execute the techniques herein.

The instructions in memory 306, ROM 308 or storage 310 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 300 may be coupled via I/O subsystem 302 to at least one output device 312. In one embodiment, output device 312 is a digital computer display. Examples of a display that may be used in various embodiments include a touch screen display or a light-emitting diode (LED) display or a liquid crystal display (LCD) or an e-paper display. Computer system 300 may include other type(s) of output devices 312, alternatively or in addition to a display device. Examples of other output devices 312 include printers, ticket printers, plotters, projectors, sound cards or video cards, speakers, buzzers or piezoelectric devices or other audible devices, lamps or LED or LCD indicators, haptic devices, actuators or servos.

At least one input device 314 is coupled to I/O subsystem 302 for communicating signals, data, command selections or gestures to processor 304. Examples of input devices 314 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 316, which may perform cursor control or other automated control functions such as navigation in a graphical interface on a display screen, alternatively or in addition to input functions. Control device 316 may be a touchpad, a mouse, a trackball, or cursor direction keys for communicating direction information and command selections to processor 304 and for controlling cursor movement on display 312. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device.

An input device 314 may include a combination of multiple different input devices, such as a video camera and a depth sensor.

In another embodiment, computer system 300 may comprise an internet of things (IoT) device in which one or more of the output device 312, input device 314, and control device 316 are omitted. Or, in such an embodiment, the input device 314 may comprise one or more cameras, motion detectors, thermometers, microphones, seismic detectors, other sensors or detectors, measurement devices or encoders and the output device 312 may comprise a special-purpose display such as a single-line LED or LCD display, one or more indicators, a display panel, a meter, a valve, a solenoid, an actuator or a servo.

When computer system 300 is a mobile computing device, input device 314 may comprise a global positioning system (GPS) receiver coupled to a GPS module that is capable of triangulating to a plurality of GPS satellites, determining and generating geo-location or position data such as latitude-longitude values for a geophysical location of the computer system 300. Output device 312 may include hardware, software, firmware and interfaces for generating position reporting packets, notifications, pulse or heartbeat signals, or other recurring data transmissions that specify a position of the computer system 300, alone or in combination with other application-specific data, directed toward host 324 or server 330.

Computer system 300 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 300 in response to processor 304 executing at least one sequence of at least one instruction contained in main memory 306. Such instructions may be read into main memory 306 from another storage medium, such as storage 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 310. Volatile media includes dynamic memory, such as memory 306. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 302. Transmission media can also take the form of acoustic or light waves, such as those generated during radio-wave and infra-red data communications.

Various forms of media may be involved in carrying at least one sequence of at least one instruction to processor 304 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 300 can receive the data on the communication link and convert the data to a format that can be read by computer system 300. For instance, a receiver such as a radio frequency antenna or an infrared detector can receive the data carried in a wireless or optical signal and appropriate circuitry can provide the data to I/O subsystem 302 such as place the data on a bus. I/O subsystem 302 carries the data to memory 306, from which processor 304 retrieves and executes the instructions. The instructions received by memory 306 may optionally be stored on storage 310 either before or after execution by processor 304.

Computer system 300 also includes a communication interface 318 coupled to bus 302. Communication interface 318 provides a two-way data communication coupling to network link(s) 320 that are directly or indirectly connected to at least one communication networks, such as a network 322 or a public or private cloud on the Internet. For example, communication interface 318 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 322 broadly represents a local area network (LAN), wide-area network (WAN), campus network, internetwork or any combination thereof. Communication interface 318 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 318 sends and receives electrical, electromagnetic or optical signals over signal paths that carry digital data streams representing various types of information.

Network link 320 typically provides electrical, electromagnetic, or optical data communication directly or through at least one network to other data devices, using, for example, satellite, cellular, Wi-Fi, or BLUETOOTH technology. For example, network link 320 may provide a connection through a network 322 to a host computer 324.

Furthermore, network link 320 may provide a connection through network 322 or to other computing devices via internetworking devices and/or computers that are operated by an Internet Service Provider (ISP) 326. ISP 326 provides data communication services through a world-wide packet data communication network represented as internet 328. A server computer 330 may be coupled to internet 328. Server 330 broadly represents any computer, data center, virtual machine or virtual computing instance with or without a hypervisor, or computer executing a containerized program system such as DOCKER or KUBERNETES. Server 330 may represent an electronic digital service that is implemented using more than one computer or instance and that is accessed and used by transmitting web services requests, uniform resource locator (URL) strings with parameters in HTTP payloads, API calls, app services calls, or other service calls. Computer system 300 and server 330 may form elements of a distributed computing system that includes other computers, a processing cluster, server farm or other organization of computers that cooperate to perform tasks or execute applications or services. Server 330 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 330 may comprise a web application server that hosts a presentation layer, application layer and data storage layer such as a relational database system using structured query language (SQL) or no SQL, an object store, a graph database, a flat file system or other data storage.

Computer system 300 can send messages and receive data and instructions, including program code, through the network(s), network link 320 and communication interface 318. In the Internet example, a server 330 might transmit a requested code for an application program through Internet 328, ISP 326, local network 322 and communication interface 318. The received code may be executed by processor 304 as it is received, and/or stored in storage 310, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 304. While each processor 304 or core of the processor executes a single task at a time, computer system 300 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A system comprising:
a plurality of host nodes, each of which comprising a container environment;
a plurality of switches configured to interconnect the plurality of host nodes;
a fabric controller configured to manage the plurality of switches and to implement policies through virtual fabric edge instances executing on each host node;
the fabric controller being further configured to implement application functions through the virtual fabric edge instances by routing application traffic from application instances in the container environment through the virtual fabric edge instances; and
a service mesh proxy executing in each of the plurality of container environments, the service mesh proxy in each container environment being configured to query the virtual fabric edge instance for data regarding application functions.

2. The system of claim 1, wherein the application functions comprise one or more of service discovery or application health checking functions.

3. The system of claim 1, wherein the fabric controller is configured to, in response to the service mesh proxy querying the virtual fabric edge instance for data regarding application functions, download the data regarding the application functions into a switch connected to the container environment containing the service mech proxy.

4. The system of claim 1, wherein the virtual fabric edge instances are configured to use VxLAN overlays to provide isolation between different application instances in a container environment.

5. The system of claim 1, wherein the fabric controller is further configured to obtain encryption keys for application instances from a container orchestrator and securely distribute the encryption keys to the virtual fabric edge instances.

6. The system of claim 1, wherein the fabric controller is configured to store data defining a rate limiting policy for an application and enforce the rate limiting policy through the virtual fabric edge instances.

7. A method comprising:
managing, by a fabric controller, a plurality of switches configured to interconnect a plurality of host nodes, each of the plurality of host nodes comprising a container environment;
implementing, by the fabric controller, policies through virtual fabric edge instances executing on each host node;
implementing, by the fabric controller, application functions through the virtual fabric edge instances by routing application traffic from application instances in the container environment through the virtual fabric edge instances; and
executing, in each of the plurality of container environments, a service mesh proxy, the service mesh proxy in each container environment being configured to query the virtual fabric edge instance for data regarding application functions.

8. The method of claim 7, wherein the application functions comprise one or more of service discovery or application health checking functions.

9. The method of claim 7, further comprising, in response to the service mesh proxy querying the virtual fabric edge instance for data regarding application functions, downloading, by the fabric controller, the data regarding the application functions into a switch connected to the container environment containing the service mech proxy.

10. The method of claim 7, wherein the virtual fabric edge instances are configured to use VxLAN overlays to provide isolation between different application instances in a container environment.

11. The method of claim 7, further comprising obtaining, by the fabric controller, encryption keys for application instances from a container orchestrator and securely distribute the encryption keys to the virtual fabric edge instances.

12. The method of claim 7, further comprising storing, buy the fabric controller, data defining a rate limiting policy for an application and enforce the rate limiting policy through the virtual fabric edge instances.

13. One or more non-transitory computer-readable media storing instructions which, when executed by one or more processors, cause performance of:
managing, by a fabric controller, a plurality of switches configured to interconnect a plurality of host nodes, each of the plurality of host nodes comprising a container environment;
implementing, by the fabric controller, policies through virtual fabric edge instances executing on each host node;
implementing, by the fabric controller, application functions through the virtual fabric edge instances by routing application traffic from application instances in the container environment through the virtual fabric edge instances; and
executing, in each of the plurality of container environments, a service mesh proxy, the service mesh proxy in each container environment being configured to query the virtual fabric edge instance for data regarding application functions.

14. The one or more non-transitory computer-readable media of claim 13, wherein the application functions comprise one or more of service discovery or application health checking functions.

15. The one or more non-transitory computer-readable media of claim 13, wherein the instructions, when executed by the one or more processors, further cause performance of, in response to the service mesh proxy querying the virtual fabric edge instance for data regarding application functions, downloading, by the fabric controller, the data regarding the application functions into a switch connected to the container environment containing the service mech proxy.

16. The one or more non-transitory computer-readable media of claim 13, wherein the instructions, when executed by the one or more processors, further cause performance of using, by the virtual fabric edge instances, VxLAN overlays to provide isolation between different application instances in a container environment.

17. The one or more non-transitory computer-readable media of claim 13, wherein the instructions, when executed by the one or more processors, further cause performance of obtaining, by the fabric controller, encryption keys for application instances from a container orchestrator and securely distribute the encryption keys to the virtual fabric edge instances.

18. The one or more non-transitory computer-readable media of claim 13, wherein the instructions, when executed by the one or more processors, further cause performance of storing, buy the fabric controller, data defining a rate limiting policy for an application and enforce the rate limiting policy through the virtual fabric edge instances.

\* \* \* \* \*